US008457787B2

(12) United States Patent
Glißmann et al.

(10) Patent No.: US 8,457,787 B2
(45) Date of Patent: Jun. 4, 2013

(54) METHOD AND CONTROL DEVICE FOR TARGETED REACTION IN THE EVENT OF A CONTACT BETWEEN A MACHINE ELEMENT OF A MACHINE AND AN OBJECT

(75) Inventors: Robert Glißmann, Aachen (DE); Michael Kaever, Erlangen (DE); Stephan Platen, Röttenbach (DE)

(73) Assignee: Siemens Aktiengesellschaft, München (DE)

( * ) Notice: Subject to any disclaimer, the term of this patent is extended or adjusted under 35 U.S.C. 154(b) by 1166 days.

(21) Appl. No.: 11/910,340

(22) PCT Filed: Mar. 29, 2006

(86) PCT No.: PCT/EP2006/061122
§ 371 (c)(1),
(2), (4) Date: May 27, 2008

(87) PCT Pub. No.: WO2006/103249
PCT Pub. Date: Oct. 5, 2006

(65) Prior Publication Data
US 2009/0048713 A1    Feb. 19, 2009

(30) Foreign Application Priority Data

Apr. 1, 2005    (DE) .......................... 10 2005 015 317

(51) Int. Cl.
*G05B 19/04*    (2006.01)
*G05B 19/18*    (2006.01)

(52) U.S. Cl.
USPC ........... 700/247; 700/178; 700/255; 700/258; 700/264; 700/245

(58) Field of Classification Search
None
See application file for complete search history.

(56) References Cited

U.S. PATENT DOCUMENTS 4,733,343 A * 3/1988 Yoneda et al. ................. 700/79
5,031,106 A * 7/1991 Tanahashi et al. ............ 700/186
(Continued)

FOREIGN PATENT DOCUMENTS

DE    101 33 612 A1    2/2003
DE    102 26 140 A1    1/2004
(Continued)

OTHER PUBLICATIONS

PID Controller Tutorial Slide Note.*
(Continued)

*Primary Examiner* — Ian Jen
(74) *Attorney, Agent, or Firm* — Henry M Feiereisen LLC

(57) ABSTRACT

The invention relates to a method for the targeted reaction in the event of contact between an element (4, 6) pertaining to a machine and an object (5, 7), and a corresponding control device (14). Upon identification of contact between the machine element (4, 6) and the object (5, 7), if the machine axle is shifted into rapid displacement mode in an automated manner during the contact by means of a control device (14), further displacement of the machine axle (3, 41, 42, 43) is stopped by the drive (42, 43) of the machine (3, 41, 42, 43) being immediately cut off. Upon identification of contact, if the machine axle is shifted into slow displacement mode in an automated manner during the contact by means of a control device (14), collision detection is carried out, further displacement of the machine axle (3, 41, 42, 43) being stopped if a collision is detected. The invention thus enables the effects of a collision of an element (4, 6) pertaining to a machine with an object (5, 7) to be maintained as low as possible.

17 Claims, 4 Drawing Sheets

U.S. PATENT DOCUMENTS

| | | | |
|---|---|---|---|
| 5,105,137 A * | 4/1992 | Iijima | 318/568.22 |
| 5,172,040 A * | 12/1992 | Sasaki et al. | 318/571 |
| 5,418,440 A * | 5/1995 | Sakaguchi et al. | 318/560 |
| 5,637,969 A * | 6/1997 | Kato et al. | 318/432 |
| 5,719,479 A * | 2/1998 | Kato et al. | 318/563 |
| 5,834,917 A * | 11/1998 | Yasui et al. | 318/568.11 |
| 5,952,804 A * | 9/1999 | Hamamura et al. | 318/560 |
| 7,908,946 B2 * | 3/2011 | Georgiadis et al. | 82/1.11 |
| 2001/0012973 A1* | 8/2001 | Wehrli et al. | 700/193 |
| 2002/0197122 A1* | 12/2002 | Mizutani et al. | 409/132 |
| 2006/0071625 A1* | 4/2006 | Nakata et al. | 318/568.12 |
| 2010/0222912 A1* | 9/2010 | Kaever et al. | 700/108 |
| 2011/0316335 A1* | 12/2011 | Bretschneider et al. | 307/11 |

FOREIGN PATENT DOCUMENTS

| | | |
|---|---|---|
| EP | 0 901 054 A1 | 3/1999 |
| EP | 1 477 284 A1 | 11/2004 |
| JP | 62 050906 A | 3/1987 |
| JP | 2146602 A | 6/1990 |
| JP | 6284764 A | 10/1994 |
| JP | 8323585 A | 12/1996 |
| JP | 9131639 A | 5/1997 |
| JP | 10143216 A | 5/1998 |

OTHER PUBLICATIONS

JP10-143216 in view of JPO English Tranlation.*

* cited by examiner

METHOD AND CONTROL DEVICE FOR TARGETED REACTION IN THE EVENT OF A CONTACT BETWEEN A MACHINE ELEMENT OF A MACHINE AND AN OBJECT

BACKGROUND OF THE INVENTION

The invention relates to a method for targeted reaction in the event of a contact between a machine element of a machine and an object.

Furthermore, the invention relates to a control device having a program memory, in which a computer program is stored which contains code sections with which, when the computer program is called up by the control device, the abovementioned method can be implemented.

In machines such as machine tools, production machines and/or robots, for example, a high degree of process accuracy is required in addition to high machining speeds and machining accuracy. A possible process fault represents a collision between a machine element, which may be present, for example, in the form of a tool or a spindle, and an object, which may be present, for example, in the form of a workpiece, a tool carriage or a tensioning apparatus. In comparison with other process faults, collisions result in the highest repair costs and the longest downtimes.

In order to avoid or at least reduce costs for repair work and downtimes, until now various systems and strategies have been developed. Commercially available mechanically operating apparatuses or systems with sensors have the disadvantage that they only become effective once a contact has been made and after an additional delay until the force has built up in the mechanical structure, with the result that it is then only possible to reduce the damage. Passive mechanical systems such as overload couplings, for example, are based on the principle that, in the event of excessive feed forces owing to, for example, sliding or latching couplings, the forces occurring are limited. The consequences of a collision in the case of rapid displacement movements can only be limited, however. One disadvantage here is the fact that, owing to the late reaction, generally significant damage results, in particular loss of manufacturing accuracy, since there is only a response when there has been considerable overloading of the components, i.e. if the force occurring is already high and is generally already causing damage. Furthermore, even in the case of very low displacement speeds, after a collision the balancing of the spindle and the tool also needs to be checked and, in an extreme case, the machine needs to be recalibrated, which requires considerable complexity.

If, as is often conventional practice, the drive torque of a drive of a machine axle to be displaced is evaluated, the response may likewise only be later since the collision is only identified if a high drive force has already been built up.

Using control-related solutions a series of collisions can be identified in advance and prevented. Collisions owing to the failure of control components can be ruled out owing to so-called safety functions in the numerical controller of the machine. The numerical controller can monitor protection zones, for example around clamping jaws and tailstock or boundary contours. The commercially available solutions are, however, often limited, for example often only the tip of an active tool is monitored and only simple geometries can be defined as protection zones. A further disadvantage is the fact that the workpiece is generally not taken into consideration. Owing to simulation of the NC program, collisions, for example between a workpiece or a tool, can be identified. In this case, the simulation functions with assumed tool and workpiece dimensions, with the result that loading with an incorrect workpiece (incorrect estimation of the dimensions by the eye, castings not removed) and incorrect tools cannot be identified. Errors when setting up a program can likewise not be identified.

SUMMARY OF THE INVENTION

The invention is based on the problem of keeping the effects of a collision between a machine element of a machine and an object as low as possible.

This problem is solved by a method for targeted reaction in the event of a contact between a machine element of a machine and an object,
   the machine element and/or the object being displaced by means of a machine axle of the machine,
   the machine having a slow and a rapid displacement mode,
   a contact between the machine element and the object being identified,
   in the event of a contact being identified, if the machine axle is displaced in automated fashion in the rapid displacement mode by means of a control device during the contact, a further displacement of the machine axle being stopped by the drive of the machine axle being brought to a stop immediately,
   in the event of a contact being identified, if the machine axle is displaced in automated fashion in the slow displacement mode by means of a control device during the contact, collision identification being carried out, and in the event of a collision being identified a further displacement of the machine axle being stopped.

Furthermore, this problem is solved by a control device having a program memory, in which a computer program is stored which contains code sections with which, when the computer program is called up by the control device, the abovementioned method can be implemented.

It has proven to be advantageous that, in the event of a contact being identified, if the machine axle is displaced manually by an operator during the contact and a machining signal is produced by the operator, collision identification is carried out, in the event of a collision being identified a further displacement of the machine axle being stopped. Even in the event of a manual displacement by an operator, this makes a targeted reaction possible in the case of a contact being identified.

Furthermore, it has proven to be advantageous that, in the event of a contact being identified, if the machine axle is displaced manually by an operator during the contact and no machining signal is produced by the operator, a further displacement of the machine axle is stopped. Even in the event of a manual displacement by an operator, this makes a targeted reaction possible in the case of a contact being identified.

Furthermore, it has proven to be advantageous that collision identification is carried out by a feedrate per cutting edge being compared with a feedrate per cutting edge limit value, a collision being identified in the event of the feedrate per cutting edge limit value being exceeded. This makes simple collision identification possible.

In addition, it has proven to be advantageous that collision identification is carried out by a rise in a cutting force being compared with a cutting force rise limit value, a collision being identified in the event of the cutting force rise limit value being exceeded. This makes particularly simple identification of a collision possible.

Furthermore, it has proven to be advantageous that the drive current of the machine axle is high-pass-filtered or bandpass-filtered and is compared with a drive current limit value, a collision being identified in the event of the drive current limit value being exceeded. This ensures particularly simple identification of a collision.

Furthermore, it has proven to be advantageous that collision identification is carried out by a force, which acts on the machine element, being compared with a force limit value and/or an acceleration of the object and/or of the machine element being compared with an acceleration limit value, a collision being identified in the event of the force limit value and/or the acceleration limit value being exceeded. This measure makes simple collision identification possible.

In addition, it has proven to be advantageous that the further displacement of the machine is stopped by first a check being carried out to ascertain whether stopping at the correct time is still possible as a result of a matched reduction in speed of the machine axle, if this is possible the machine axle being stopped as a result of a matched reduction in speed, and if this is not possible the drive of the machine axle being brought to a stop immediately. This makes a stop reaction which is matched to the respective situation possible.

Furthermore, it has proven to be advantageous that the machine element is arranged electrically insulated from the object, and an electrical voltage is applied between the machine element and the object, the contact between the machine element and the object being identified by a detection current produced in the event of a contact being detected. This measure makes simple and safe contact identification possible.

In this context, it has proven to be advantageous that a collision is identified if, after detection of the contact, the detection current exceeds a detection current limit value uninterrupted for over a defined period of time. This makes simple and safe identification of a collision possible.

Furthermore, it has proven to be advantageous that the contact between the machine element and the object is identified by, in the case of an unexpected change in the displacement speed of the machine axle, a contact being identified. This measure makes safe and reliable identification of a contact possible.

Furthermore, it has proven to be advantageous that the machine element is in the form of a tool or in the form of a spindle. Designs of the machine element in the form of a tool or spindle represent conventional designs of the machine element.

Furthermore, it has proven to be advantageous that the object is in the form of a workpiece, tool carriage or in the form of a tensioning apparatus. Designs of the object in the form of a workpiece, tool carriage or in the form of a tensioning apparatus represent conventional designs of such an object.

Furthermore, it has proven to be advantageous that the drive of the machine axle is brought to a stop immediately by first a check being carried out to ascertain whether a sufficient reduction in damage can be achieved by braking with the drive, if this is possible the machine axle being stopped by the drive, and if this is not possible additional brakes being used to bring the machine axle to a stop and/or the force flow being opened. This measure makes it possible to bring the machine axle to a stop in optimized fashion.

In addition, it has proven to be advantageous that the machine is in the form of a machine tool, production machine and/or in the form of a robot. Designs of the machine in the form of a machine tool, production machine and/or in the form of a robot represent conventional designs of the machine, but the invention is of course also suitable for other machines.

In addition, it has proven to be advantageous that a computer program product for the control device according to the invention is provided which contains code sections, with which the method according to the invention can be implemented.

In addition, it has proven to be advantageous to design a machine tool, production machine and/or a robot to have the control device according to the invention.

Advantageous designs of the control device are provided in a similar way to advantageous forms of the method, and vice versa.

BRIEF DESCRIPTION OF THE DRAWING

An exemplary embodiment of the invention is illustrated in the drawing and will be explained in more detail below. In the drawing.

DETAILED DESCRIPTION OF PREFERRED EMBODIMENTS

Figure 1:
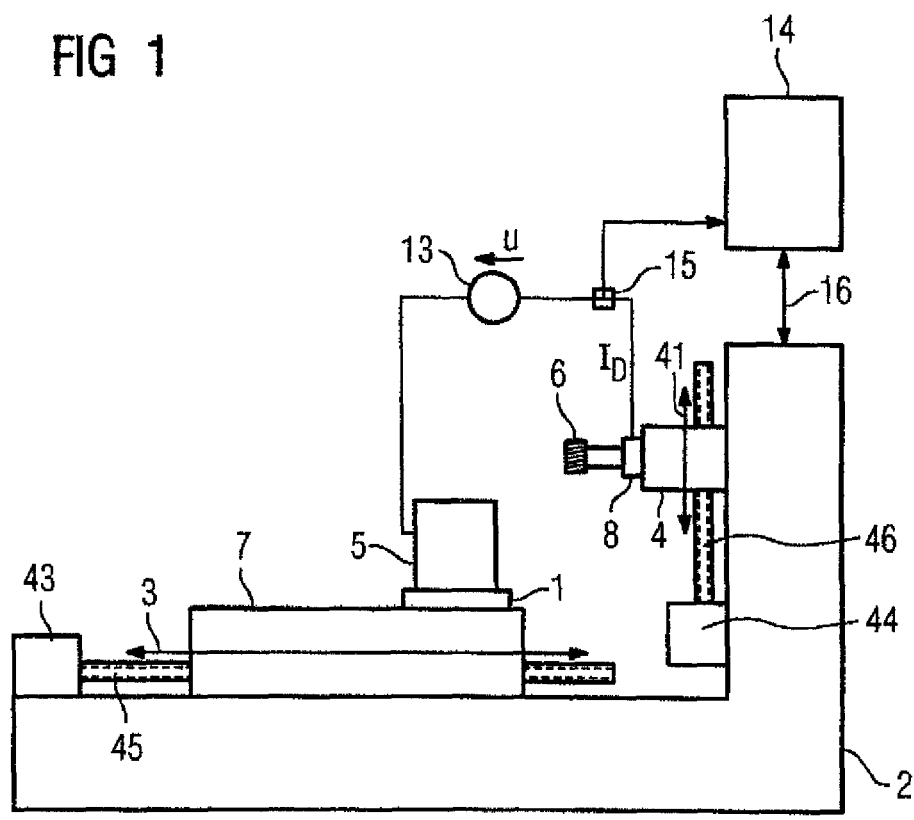
FIG. 1 shows a machine tool.

FIG. 1 illustrates, in the form of an exemplary embodiment and in schematic form, a machine tool. The machine tool has a machine bed 2, a tool carriage 7 and a drive 4, which drives a tool 6 via a spindle 8. Furthermore, the machine has a control device 14 (for example a numerical controller) for controlling the machine. The control device 14 controls the machine via a connection 16. The machine illustrated by way of example has two machine axles. The tool carriage 7 can therefore be displaced in the direction of the double arrow 3 (horizontal machine axle) in the horizontal direction by means of a drive 43 of the horizontal machine axle and the drive 4 for the rotary driving of the spindle with the spindle 8 and the tool 6 can be displaced in the vertical direction, in the direction of the double arrow 41 (vertical machine axle) by means of a drive 44 of the vertical machine axle. The drives 43 and 44 have, for this purpose, drive shafts 45 and 46 for the purpose of producing the corresponding linear movements. A workpiece 5, to be machined by means of the tool 6, is arranged on the tool carriage 7, the workpiece 5 being arranged electrically insulated from the tool carriage 7 by means of an insulator 1. Insulation can in this case also be provided at other points. Alternatively, it is, for example, also conceivable to electrically insulate the tool carriage or the spindle. The workpiece 5 can be displaced in the horizontal direction by means of the tool carriage 7. Note will be made at this point of the fact that, within the context of the invention, the tool 6 is regarded as a machine element of the machine. In the exemplary embodiment, the tool 6 is in the form of a milling cutter. In order to machine the workpiece 5, the two machine axles and therefore the workpiece 5 and the tool 6 are displaced correspondingly by the control device 14.

In this case, unexpected, that is to say undesired collisions may occur between machine elements such as, for example, the tool 6 or the spindle 8 and objects such as, for example, the workpiece 5 or the tool carriage 7. In this case, in the context of the invention a collision is understood to mean not simple contact between the machine element and the object but a contact which is associated with a subsequent high force impact on the object and/or on the machine components. Since customary collision identification is based on detecting this high force impact, in customary systems no contact identification is carried out, but instead the high forces occurring after the contact and their effects are detected.

With the aid of the method according to the invention, as early as when a contact is identified a targeted reaction is intended to be introduced immediately in order to make it possible to stop the drives driving the machine axle if possible even before the occurrence of high forces to which the machine axles would be subjected in the event of a further displacement. In this case, depending on the displacement speeds, in each case targeted reactions are introduced even in the case of essentially mere contact between a machine element and an object.

In the exemplary embodiment, the workpiece 5 is arranged insulated from the tool carriage 7 by means of an insulator 1. In order to detect a contact between the workpiece 5 and the tool 6 or the spindle 4, a voltage U is applied between the workpiece 5 and the tool 6 by means of a voltage source 13, which is electrically conductively connected to the spindle 4. In the event of a contact occurring between the workpiece 5 and the tool 6, i.e. in the event of the presence of even a slight touching contact between the workpiece 5 and the tool 6, a detection current $I_D$ begins to flow, which is detected by a measuring device 15 and is supplied to the control device 14 as an input variable. Depending on the state of the machine, in the event of a contact being identified by the control device 14 the method for targeted reaction shown in FIG. 2 is introduced.

Note will be made at this point of the fact that, in addition to or as an alternative to contact identification by means of the abovedescribed detection current $I_D$, contact identification can take place by the displacement speed of the machine axles involved being calculated with the aid of the measurement systems which are provided in any case in the machine and, in the case of an unexpected change in the displacement speed of a machine axle, a contact being identified. Such an unexpected change in the displacement speed can be set to be very sensitive, so that likewise high forces are not required in order to cause it to respond. This is especially possible since interfering signal influences such as accelerations can be suppressed by corresponding desired value inputs.

Figure 2:
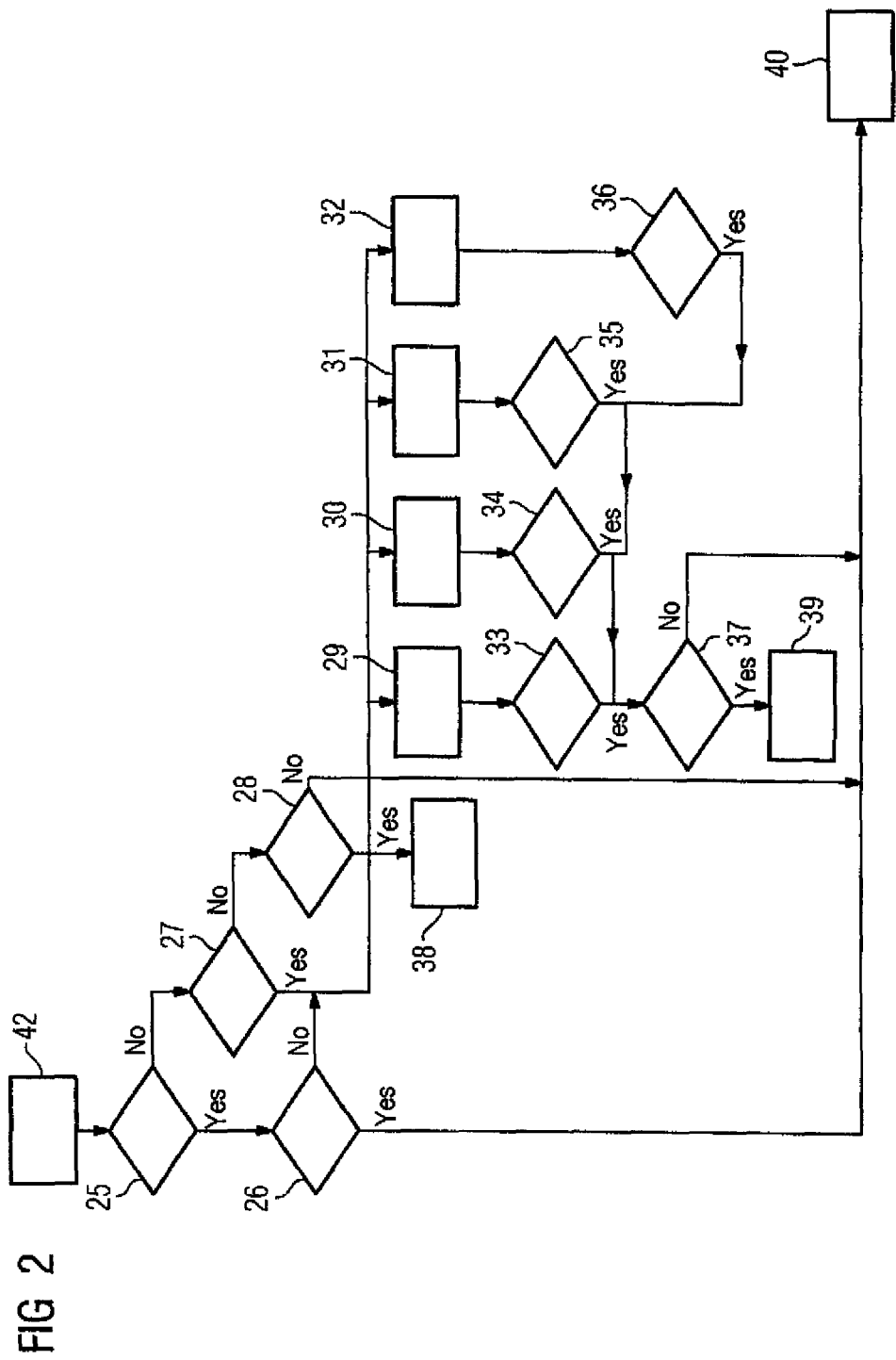
FIG. 2 shows a flowchart of the method according to the invention.

FIG. 2 illustrates, in the form of a flowchart, the sequence of the method according to the invention. After the abovedescribed contact identification 42 has identified a contact, first an enquiry is made in a decision block 25 to ascertain whether a machine axle during the contact is at that time being displaced by means of the control device 14 in automated fashion, i.e. controlled by the control device 14, and not by means of manual operation. If this is the case, an enquiry is then made in a further decision block 26 to ascertain whether the machine is at that time in a rapid displacement mode. Customary machines have essentially two basic displacement modes, namely a slow displacement mode and a rapid displacement mode. In the rapid displacement mode, the corresponding machine axle is displaced rapidly in order to, for example, move the tool out of a basic position for the first time into the vicinity of the workpiece. Such a rapid displacement mode is also conventionally referred to as the so-called fast motion state. The slow displacement mode is understood to mean a slow displacement of the machine axle. This is understood to mean, for example, displacement with a feedrate, which is used during the actual machining operation (for example during the milling operation) and only has a slow displacement speed.

If it is established in the decision block 26 that the machine is at that time in the rapid displacement mode, a further displacement of the machine axle is stopped by the drive of the machine axle being brought to a stop immediately by means of the emergency stop module 40, i.e. the machine is stopped as rapidly as possible. Conventionally, such a stop is also referred to as an emergency stop, possibly also additional brakes being used to stop the machine axle as rapidly as possible and/or the force flow being mechanically opened, for example by means of actively or passively opening couplings. The use of mechanical brakes and the interruption of the force flow can result in a certain degree of complexity for bringing the machine back into operation. These reactions are therefore preferably triggered on the basis of an estimation of the risk of damage. In a normal case, all the other machine axles are also stopped.

For this purpose, a check is first carried out in the emergency stop module 40 to ascertain whether a sufficient reduction in damage can be achieved by braking with the drive, if this is possible the machine axle 3, 41, 42, 43 being stopped by the drive 42, 43, and if this is not possible additional brakes being used to bring the machine axle to a stop and/or the force flow being opened mechanically.

If it is established in the decision block 26 that the machine axle is not at that time being displaced with the rapid displacement mode, collision identification is carried out by means of the collision identification modules 29, 30, 31 and 32. The individual modules 29, 30, 31 and 32 for collision identification in this case operate parallel, it naturally also being possible for the collision identification to be carried out by fewer modules.

Figure 3:
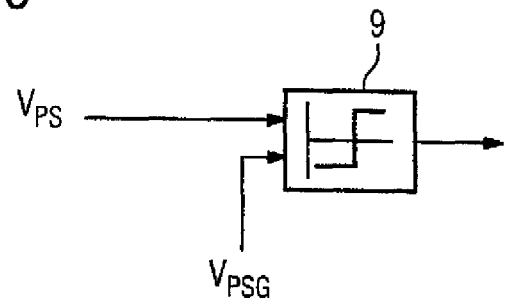
FIG. 3 shows a method for collision identification by means of evaluation of the feedrate per cutting edge.

A collision is identified in a module 29 for monitoring the feedrate per cutting edge by the feedrate per cutting edge of the tool being compared with a predetermined feedrate per cutting edge limit value, a collision being identified in the event of the feedrate per cutting edge limit value being exceeded. FIG. 3 illustrates the function diagram corresponding to this. If the present value of the feedrate per cutting edge $V_{PS}$ exceeds the predetermined feedrate per cutting edge limit value $V_{PSG}$, a limit value signaling device 9 produces on the output side a corresponding signal which indicates a collision.

Figure 4:
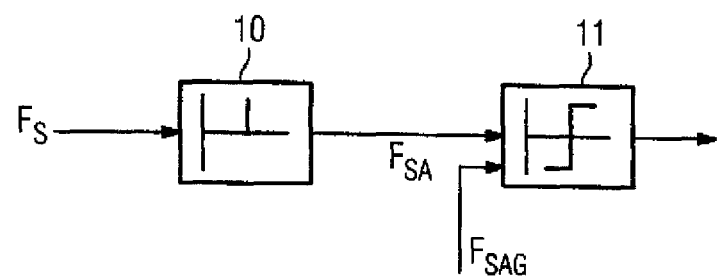
FIG. 4 shows a method for collision identification by means of evaluation of the cutting force.

Furthermore, collision identification is carried out in a module 30 for monitoring the cutting force by a rise $F_{SA}$ in the cutting force $F_S$ being compared with a cutting force rise limit value $F_{SG}$, a collision being identified in the event of the cutting force rise limit value $F_{SG}$ being exceeded. For this purpose, the cutting force $F_S$ determined by the control device 14, for example from the drive current of the machine axle, shown in FIG. 4 is supplied to a differentiator 10 and in this way the cutting force rise $F_{SA}$ is determined, the cutting force rise $F_{SA}$ being compared with the cutting force rise limit value $F_{SAG}$ by means of a limit value signaling device 11 and a collision being identified in the event of the cutting force rise limit value $F_{SAG}$ being exceeded by the limit value signaling device 11 producing a corresponding output signal in the event of the cutting force rise limit value $F_{SAG}$ being exceeded. It is possible to achieve, by means of an additional connection delay element (not illustrated), which is connected downstream of the limit value signaling device 11, a situation in which a collision is only identified when the cutting force rise limit value is exceeded uninterrupted for over a predetermined period of time $T_3$.

Figure 8:
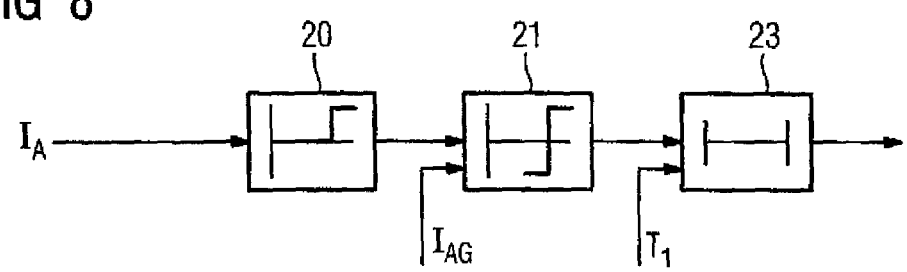
FIG. 8 shows a method for identification of a collision by means of evaluation of the drive current.

FIG. 8 illustrates the way in which the module 31 for collision identification functions. The drive current $I_A$ for driving the machine axle is first high-pass-filtered by means of a high-pass filter 20 and then compared with a drive current limit value $I_{AG}$ in a limit value signaling device 21, a collision being identified if the limit value exceeds the drive current limit value $I_{AG}$ uninterrupted over a predetermined period of time $T_1$, which is realized by means of a connection delay element 23. As an alternative or in addition, the force $F_M$ acting on the machine element or a variable derived from the drive current $I_A$ can also be evaluated analogously, in accordance with the function diagram described in FIG. 8 for collision identification, by being compared with a corresponding limit value.

As an alternative or in addition to this, collision identification can also take place by means of monitoring of the detection current $I_D$ in the module 31. If, after the detection of the contact, the detection current $I_D$ exceeds a detection current limit value $I_{DG}$ uninterrupted for a defined period of time $T_2$, a collision is likewise identified.

Figure 9:
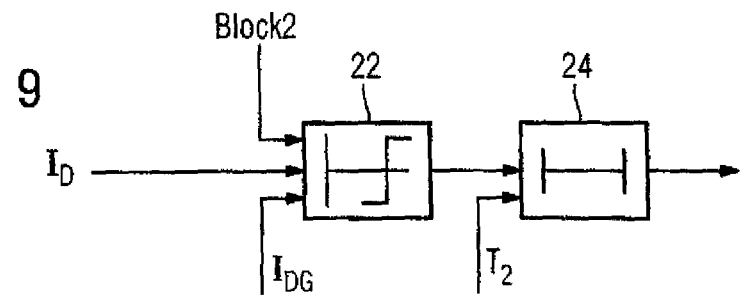
FIG. 9 shows a method for collision identification by means of evaluation of a detection current.

FIG. 9 illustrates the corresponding function circuit diagram with a limit value signaling device 22 and a connection delay element 24. In this case, the limit value signaling device 22 needs to be blocked by means of a blocking signal Block2 if, for example, the tool is in the form of a milling cutter and the milling cutter has already entered the workpiece as far as its diameter, in order to avoid erroneous trigger events.

Figure 5:
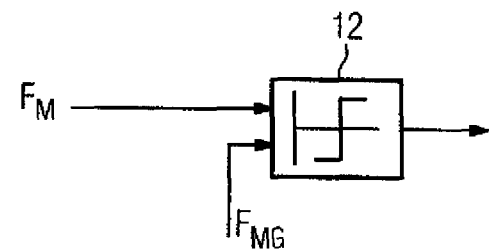
FIG. 5 shows a method for collision identification by means of evaluation of a force acting on a machine element.

Furthermore, collision monitoring is carried out in the module 32 for monitoring a force $F_M$ acting on the machine element by the force $F_M$ acting on the machine element being compared with a force limit value $F_{MG}$, a collision being identified in the event of the force limit value $F_{MG}$ being exceeded. A corresponding function diagram is illustrated in FIG. 5. The force $F_M$ acting on the machine element can in this case be derived, for example, from the drive current of the machine axle or else special force sensors can be fitted to the machine which directly measure the force $F_M$. If the limit value signaling device 12 outputs a corresponding signal in the event of the force limit value $F_{MG}$ being exceeded, a collision is identified. As an alternative or in addition to this, an acceleration of the object and/or the machine element can be compared with an acceleration limit value and a collision identified in the event of the acceleration limit value being exceeded. For this purpose, the acceleration can be measured, for example, by means of acceleration sensors.

The collision identification modules 29, 30, 31 and 32 can in this case carry out permanent monitoring or can only carry out monitoring for a predetermined period of time after identification of a contact.

If a collision is identified in the respectively associated decision blocks 33, 34, 35 and 36, i.e. if a collision is identified in the modules 29, 30, 31 and 32 for collision identification, a check is carried out in a further decision block 37 to ascertain whether stopping at the correct time is still possible owing to a reduction in speed of the machine axle which is matched to the present state of the machine axle (for example as regards mass, speed, oscillation response), if this is possible the machine axle being stopped by a matched reduction in speed in order to carry out the braking operation if possible without any oscillations or deviations of the machine axle from a predetermined movement path. Stopping by means of a matched reduction in speed is carried out in a stopping module 39. If stopping is no longer possible by means of a matched reduction in speed, the drive of the machine axle is immediately brought to a stop by means of the emergency stop module 40.

If the decision block 25 establishes that there is no automated displacement, i.e. that the machine axle is being displaced manually by an operator during the contact and a machining signal is produced by the operator, for example by means of the press of a button, which is queried in a decision block 27, then collision identification is carried out, a further displacement of the machine axle being stopped in the event of a collision being identified. The machining signal indicates that the operator wishes to carry out machining, for example, of the workpiece manually.

If the machine axle is displaced manually by an operator during the contact and no machining signal is produced by the operator, it is determined in a decision block 28 whether stopping at the correct time by means of a matched reduction in speed of the machine is still possible. If this is still possible the machine axle is stopped by the stopping module 38 by means of a matched reduction in speed, and if this is not possible then the drive of the machine axle is brought to a stop immediately by the emergency stop module 40.

With the aid of the press of a button, the operator can therefore still manually intervene in the process. Furthermore, the operator can set the setup signal possibly by means of the press of a button. This ensures that the fast motion mode speed is reduced so severely that an economically appropriate reduction in damage is achieved by the monitoring based on contact identification.

Figure 7:
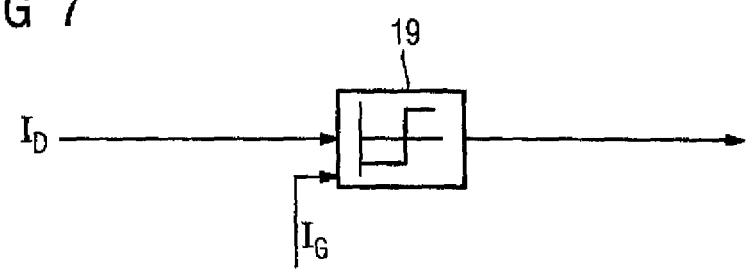
FIG. 7 shows a further method for identification of a contact between a machine element and an object.

FIG. 7 illustrates the contact identification by means of the evaluation of the detection current $I_D$. The detection current $I_D$ is compared with a current limit value $I_G$, which is preferably zero, by means of a limit value signaling device 19. In the event of the current limit value $I_G$ being exceeded, a corresponding output signal is produced by the limit value signaling device 19, which indicates an identified contact.

Figure 6:
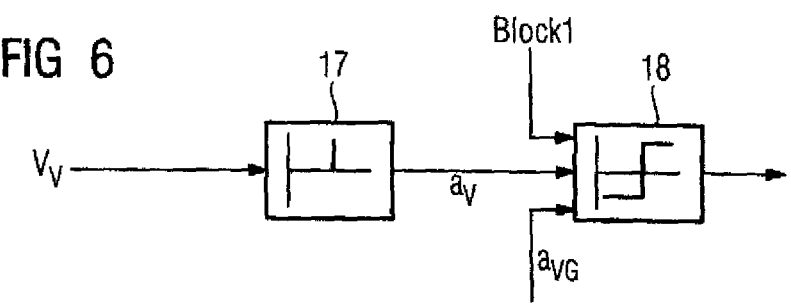
FIG. 6 shows a method for identification of a contact between a machine element and an object.

FIG. 6 shows the collision identification by means of evaluation of the displacement speed $v_V$. The displacement speed $v_V$ is in this case first derived by means of a differentiator 17 on the basis of time and in this way the displacement acceleration $a_V$ is determined from the output of the differentiator 17, which displacement acceleration $a_V$ corresponds to a change in the displacement speed $v_V$. If the displacement acceleration $a_V$ exceeds a displacement acceleration limit value $a_{VG}$, a signal, which indicates a contact, is produced by the limit value signaling device 18. In order to avoid errors in the detection in the event of changes to be expected in the displacement speed $v_V$, for example during run-up or during an intentional stopping operation, the machine axle is blocked by the control device 14 with the aid of a blocking signal Block1 of the limit value signaling device 18 in the event of changes to be expected in the displacement speed $v_V$.

Mention will be made at this point of the fact that, if the signals for identifying a contact and collision are superimposed by undesired interference variables such as friction and acceleration, the undesired interfering influences are eliminated from the signals by means of signal correction.

Furthermore, it is advantageous if, for the particularly critical phases such as setup and running-in of a new part program, if a setup signal is produced by the operator, for example by means of the press of a button and the machine is in the rapid displacement mode, the speed of the machine axle is reduced in such a way that a reduction in the damage is possible which is sensible in terms of economic aspects. Mention will be made at this point of the fact that the rapid displacement mode is not only understood as meaning a displacement of the machine axle in the fast motion state, but, for example, also a displacement with a high feedrate, a check being carried out in the event of a set setup signal to ascertain whether an economically sensible reduction in damage is possible at the feedrate. If this is not possible, the feedrate is reduced to a suitable extent.

What is claimed is:

1. A method for controlling movement of a machine axle in the event of contact between a machine element of the machine and an object, the machine having a slow and a fast displacement mode, the method comprising the steps of:
producing with the machine axle a relative movement between the machine element and the object,
detecting contact between the machine element and the object,
if the machine axle is moved automatically by a control device in fast displacement mode when making contact, preventing further movement of the machine axle by checking if damage to the machine can be adequately limited when braking with the drive alone, and if damage can be adequately limited, stopping the machine axle with the drive alone, or if damage cannot be adequately limited, using an additional brake to immediately stop the machine axle, or
if the machine axle is moved automatically by the control device in slow displacement mode when making contact, first identifying a collision and thereafter stopping further movement of the machine axle.

2. The method of claim 1, wherein if contact is detected, and if the machine axle is moved manually by an operator during the contact and the operator generates a machining signal, identifying a collision and stopping movement of the machine axle.

3. The method of claim 1, wherein if contact is detected, and if the machine axle is moved manually by an operator during the contact and the operator does not generate a machining signal, stopping further movement of the machine axle.

4. The method of claim 1, wherein identifying a collision comprises the steps of comparing an actual feedrate for a cutting edge with a feedrate limit value for a cutting edge, and recognizing a collision if the actual federate exceeds the feedrate limit value for the cutting edge.

5. The method of claim 1, wherein identifying a collision comprises the steps of comparing an actual rise in a cutting force with a cutting force rise limit value for a cutting edge, and recognizing a collision if the actual rise in a cutting force exceeds the cutting force rise limit value for the cutting edge.

6. The method of claim 1, wherein identifying a collision comprises the steps of comparing an actual high-pass-filtered or bandpass-filtered drive current of the machine axle with a drive current limit value, and recognizing a collision if the actual high-pass-filtered or bandpass-filtered drive current exceeds the drive current limit value.

7. The method of claim 1, wherein identifying a collision comprises the steps of comparing an actual force acting on the machine element with a force limit value, or comparing an actual acceleration of the object or the machine element with an acceleration limit value, and recognizing a collision if the actual force acting on the machine element exceeds the force limit value or if the actual acceleration of the object or the machine element exceeds the acceleration limit value.

8. The method of claim 1, further comprising the steps of:
checking if movement of the machine can be stopped in time by a controlled decrease in the speed of the machine axle,
if the machine element can be stopped in time, stopping the machine element by controllably decreasing the speed of the machine axle, or
if the machine element cannot be stopped in time, immediately stopping the drive of the machine axle.

9. The method of claim 1, wherein the machine element is electrically isolated from the object, and further comprising the steps of applying an electric voltage between the machine element and the object, and detecting contact between the machine element and the object by detecting a current flow between the machine element and the object in the event of contact.

10. The method of claim 9, wherein a collision is identified if the detection current continuously exceeds a detection current limit value for a defined period of time after detecting contact.

11. The method of claim 1, wherein contact between the machine element and the object is detected by detecting an unexpected change in the speed with which the machine axle moves.

12. The method of claim 1, wherein the machine element is implemented as a tool or a spindle.

13. The method of claim 1, wherein the object is implemented as a workpiece, a tool carriage or a clamping device.

14. The method of claim 1, wherein the machine is implemented as a machine tool, a production machine or a robot.

15. A control device having a program memory, in which a computer program is stored which contains code sections to enable the control device when the code sections of the computer program are executed in the control device, to control movement of a machine axle in the event of contact between a machine element of a machine and an object, the machine having a slow and a fast displacement mode, by
producing with the machine axle a relative movement between the machine element and the object,
detecting contact between the machine element and the object,
if the machine axle is moved automatically by a control device in fast displacement mode when making contact, preventing further movement of the machine axle by checking if damage to the machine can be adequately limited when braking with the drive alone, and if damage can be adequately limited, stopping the machine axle with the drive alone, or if damage cannot be adequately limited, using an additional brake to immediately stop the machine axle, or
if the machine axle is moved automatically by the control device in slow displacement mode when making contact, identifying a collision and stopping further movement of the machine axle.

16. A computer program product comprising code sections stored in a program memory of a control device which enable the control device when the code sections of the computer program are executed in the control device, to control movement of a machine axle in the event of contact between a machine element of the machine and an object, the machine having a slow and a fast displacement mode, by
producing with the machine axle a relative movement between the machine element and the object,
detecting contact between the machine element and the object,
if the machine axle is moved automatically by a control device in fast displacement mode when making contact, preventing further movement of the machine axle by checking if damage to the machine can be adequately limited when braking with the drive alone, and if damage can be adequately limited, stopping the machine axle with the drive alone, or if damage cannot be adequately limited, using an additional brake to immediately stop the machine axle, or if the machine axle is moved automatically by the control device in slow displacement mode when making contact, identifying a collision and stopping further movement of the machine axle.

17. A machine tool, production machine or robot, comprising a control device having a program memory, in which a computer program is stored which contains code sections to enable the control device when the code sections of the computer program are executed in the control device, to control movement of a machine axle in the event of contact between a machine element of a machine and an object, the machine having a slow and a fast displacement mode, by producing with the machine axle a relative movement between the machine element and the object, detecting contact between the machine element and the object, if the machine axle is moved automatically by a control device in fast displacement mode when making contact, preventing further movement of the machine axle by checking if damage to the machine can be adequately limited when braking with the drive alone, and if damage can be adequately limited, stopping the machine axle with the drive alone, or if damage cannot be adequately limited, using an additional brake to immediately stop the machine axle, or if the machine axle is moved automatically by the control device in slow displacement mode when making contact, identifying a collision and stopping further movement of the machine axle.

\* \* \* \* \*